(12) United States Patent
Stellberger

(10) Patent No.: US 6,670,790 B2
(45) Date of Patent: Dec. 30, 2003

(54) POWER SWITCH FOR BATTERY PROTECTION

(75) Inventor: Achim Stellberger, Kronau (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 203 days.

(21) Appl. No.: 10/017,601

(22) Filed: Dec. 14, 2001

(65) Prior Publication Data

US 2003/0122525 A1 Jul. 3, 2003

(51) Int. Cl.⁷ .................................................. H02J 7/00
(52) U.S. Cl. ........................................ 320/134; 320/132
(58) Field of Search ................................ 320/134, 132, 320/136, 128, 130, 156, 157, 158, 159

(56) References Cited

U.S. PATENT DOCUMENTS

| | | | |
|---|---|---|---|
| 5,063,471 A | 11/1991 | Park | 361/18 |
| 5,081,371 A | 1/1992 | Wong | 307/296.2 |
| 5,789,900 A * | 8/1998 | Hasegawa et al. | 320/132 |
| 5,933,046 A | 8/1999 | Ramet et al. | 327/534 |
| 6,087,807 A | 7/2000 | Sudo et al. | 320/128 |
| 6,160,381 A | 12/2000 | Peterzell | 320/134 |
| 6,246,214 B1 | 6/2001 | Oglesbee | 320/136 |

FOREIGN PATENT DOCUMENTS

| | | | |
|---|---|---|---|
| EP | 0720270 A2 | 3/1996 | H02J/7/10 |
| JP | 2001177387 | 6/2001 | H03K/17/00 |
| WO | WO0059093 | 5/2000 | H02J/7/00 |

* cited by examiner

Primary Examiner—Michael Sherry
Assistant Examiner—Lawrence Luk
(74) Attorney, Agent, or Firm—George O. Saile; Stephen B. Ackerman; Douglas R. Schnabel

(57) ABSTRACT

A new battery charging, discharging, and protection circuit is achieved. The circuit comprises, first, a FET switch having gate, source, drain, and bulk. The FET switch may comprise either a NMOS device or a PMOS device. The source is coupled to a load terminal, and the drain is coupled to a battery terminal. Second, a means of controlling the FET switch gate and the bulk is included. The FET switch gate voltage determines the OFF and ON state of said FET switch. The bulk is switchably coupled between the battery terminal and the load terminal. A cascaded version is disclosed.

32 Claims, 7 Drawing Sheets

POWER SWITCH FOR BATTERY PROTECTION

BACKGROUND OF THE INVENTION

(1) Field of the Invention

The invention relates to a circuit for protecting a battery, and more particularly, to a circuit for controlling the charging, discharging, and protection of a rechargeable battery.

(2) Description of the Prior Art

Rechargeable batteries are used in a variety of applications of portable electronic devices. In particular, rechargeable batteries are used for portable phones. Several types of batteries are used in the art, most notably those comprising lithium ion or $Li^+$. For optimum battery life and performance, the battery must be protected from excessive charging voltage during recharging and from over discharging while supplying the appliance.

Referring now to FIG. 1, an exemplary prior art battery protection circuit. A rechargeable battery 10 is configured such that it can source energy to a load 34 or can be recharged by a charger source 38. Two MOSFET switches N1 18 and N2 26 are used to control the flow of current into (charging) and out of (discharging) the battery. The control circuit 14 controls the ON and OFF state of the switches 18 and 26. Typically, the switches comprise discrete devices. Each switch 18 and 26 contains a parasitic bulk-to-drain diode D1 22 and D2 30. By coupling each switch in an opposite manner, each of the parasitic diodes 22 and 30 conducts current in a different direction.

During normal charging or discharging of the battery 10, both of the switches are ON. However, if the control circuit 14 detects an over charging voltage from VBATT to GND, then the control circuit turns OFF the switch N1. Since the parasitic diode D1 22 also blocks current flow into the battery, the battery stops charging. In the case of an over discharging condition, the control circuit 14 would detect a too low battery voltage from VBATT to GND. The other switch N2 26 would be turned OFF. In this case, the parasitic diode D2 30 blocks current flow out of the battery 10.

The prior art circuit has at least two disadvantages. First, two FET switches are required in order to obtain two-directional switching capability. Therefore, the series resistance of the battery pack is increased. Second, the use of discrete components increases the manufacturing cost and space requirements for the protection circuit.

Several prior art inventions describe battery protection circuits and devices related to bulk switching. U.S. Pat. No. 6,246,214 to Oglesbee shows a battery protection circuit having only one MOSFET switch. A voltage protection circuit is used to limit the voltage so that a single MOSFET can be used for two directional current control. U.S. Pat. No. 5,063,471 to Park discloses a battery protection circuit. U.S. Pat. No. 5,789,900 to Hasegawa et al discloses a battery protection circuit showing two MOSFETs having back-to-back diodes. U.S. Pat. No. 6,160,381 to Peterzell discloses a battery pack protection circuit. Two MOS switches are used. U.S. Pat. No. 5,081,371 to Wong describes a charge pump circuit where back gate biased MOSFETs are used. U.S. Pat. No. 5,933,046 to Ramet et al teaches an analog switch formed from a MOSFET that has a switchable bulk connection.

SUMMARY OF THE INVENTION

A principal object of the present invention is to provide an effective and very manufacturable circuit for protecting a battery.

A further object of the present invention is to provide a battery protection circuit for controlling charging and discharging of a battery.

A still further object of the present invention is to control both charging and discharging via a single FET having a switchable bulk connection.

Another still further object of the present invention is to cascade switchable bulk FET devices to increase the voltage range of the circuit.

Yet another still further object of the present invention is to charge the middle node between cascaded FET devices to improve performance.

Another still further object of the present invention is to form the switchable bulk FET devices using either NMOS or PMOS devices.

In accordance with the objects of this invention, a battery charging, discharging, and protection circuit is achieved. The circuit comprises, first, a FET switch having gate, source, drain, and bulk. The FET switch may comprise either a NMOS device or a PMOS device. The source is coupled to a load terminal, and the drain is coupled to a battery terminal. Second, a means of controlling the FET switch gate and the bulk is included. The FET switch gate voltage determines the OFF and ON state of said FET switch. The FET bulk is switchably coupled between the battery terminal and the load terminal.

Also in accordance with the objects of the present invention, a battery charging, discharging, and protection circuit is achieved. The circuit comprises, first, a first FET switch having gate, source, drain, and bulk. The drain is coupled to a battery terminal. Second, a second FET switch having gate, source, drain, and bulk is used. The drain is coupled to the first NMOS FET switch source to thereby form a mid node. The source is coupled to a load terminal. Finally, a means of controlling the first and second FET gates and the switchable bulks is used. The first and second FET switch gates voltages determine the OFF and ON states of the first and second FET switches. The first FET bulk is switchably coupled between the battery terminal and the mid node. The second FET bulk is switchably coupled between the mid node and the load terminal.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit for protecting a battery. The circuit uses a novel, single FET device having a switchable bulk connection to achieve control of both charging and discharging current. Additional switchable bulk FET devices may be cascaded to increase the operating range of the circuit. It should be clear to those experienced in the art that the present invention can be applied and extended without deviating from the scope of the present invention.

Figure 1:
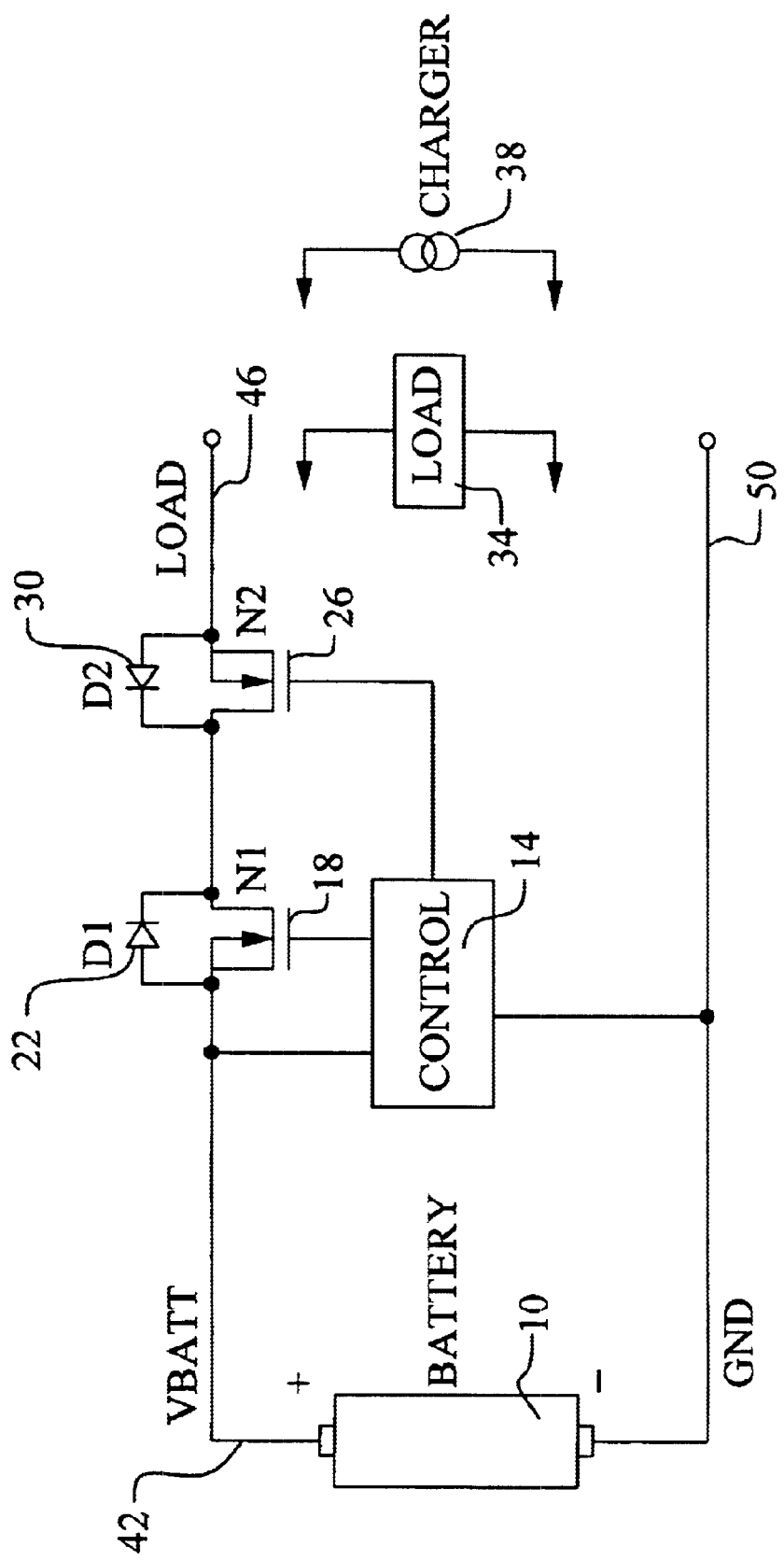
FIG. 1 illustrates a prior art battery protection circuit.
Figure 2:
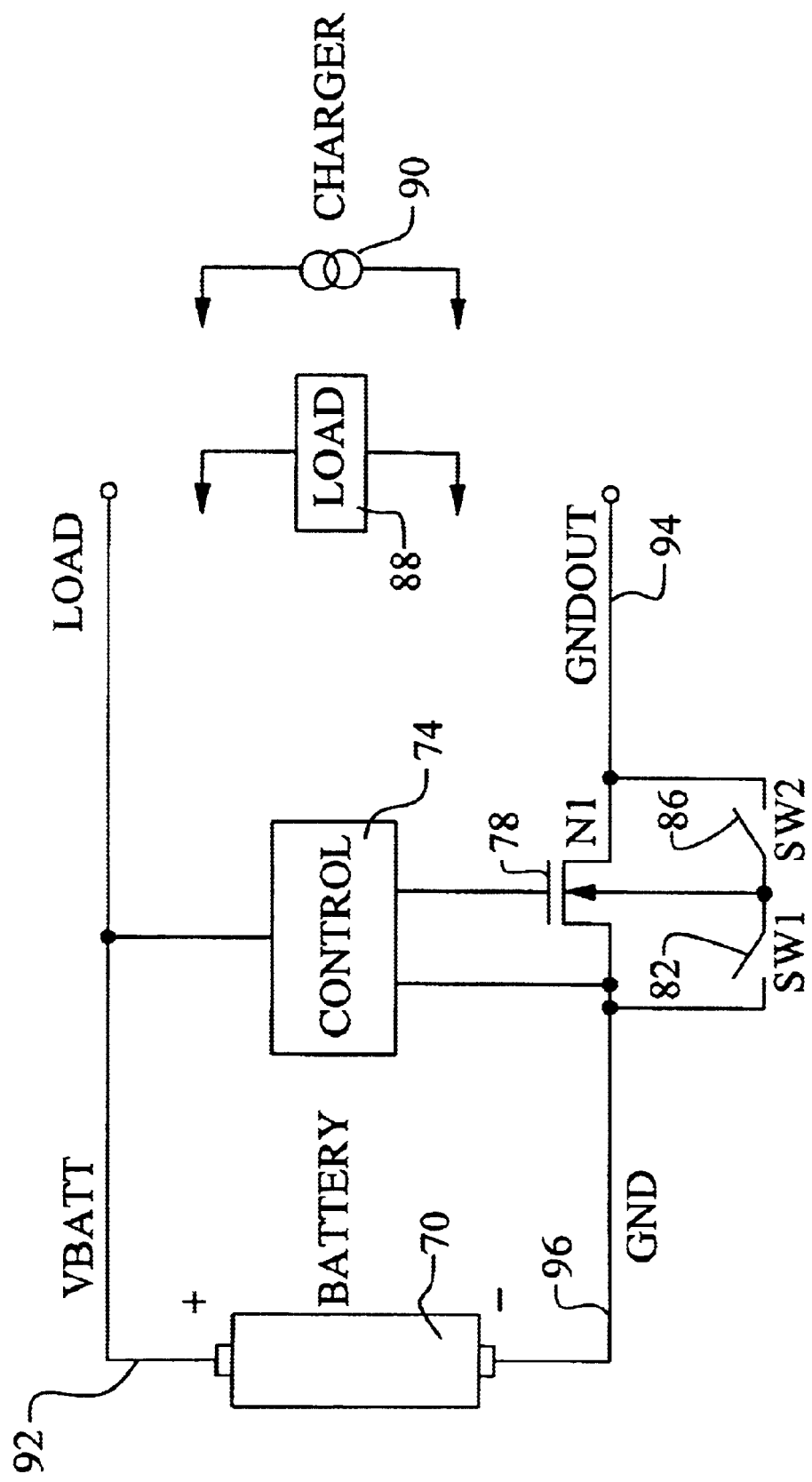
FIG. 2 illustrates a first preferred embodiment of the battery protection circuit of the present invention where the FET switch is NMOS.

Referring now to FIG. 2, the first preferred embodiment of the battery protection circuit of the present invention is illustrated. Several important features of the present invention are shown. A battery 70 preferably comprises a rechargeable battery. The circuit is configured to allow the battery 70 to source current to a load 88 or to be recharged by a charging source 90. The battery 70 preferably comprises a two-terminal device. In the illustration, the positive terminal is labeled VBATT 92. The negative terminal is labeled GND 96.

The battery protection circuit comprises, first, a FET switch N1 78. In this version of the first preferred embodiment, a single FET switch and, more preferably, a NMOS FET switch 78 is used. An alternative version, showing a PMOS FET switch is shown as FIG. 6. Referring again to FIG. 2, the FET switch N1 78 is preferably fabricated in a standard MOS process such that the control circuit 74 and the switch N1 78 can be fabricated on the same substrate. As a particularly important feature, the NMOS FET N1 78 must be fabricated in a well (p-type) that can be isolated from the semiconductor substrate. In this way, the well, or bulk, of the device can be biased independently of the substrate. The NMOS FET switch N1 78 has gate, drain, source, and bulk connections. The source is coupled to the external load terminal GNDOUT 94 that is further coupled to an external device, such as a portable phone circuit or a charging source 90. The drain is coupled to the negative battery terminal GND 96. The gate is coupled to the control circuit 74. The control circuit 74 monitors the battery 70 voltage, from VBATT 92 to GND 96, to protect the battery from over charging and from over discharging.

A most important feature of the present invention is the configuration of the bulk connection of the NMOS FET N1 78. Note that the bulk is not coupled to either the source or the drain as in the prior art. Further, the bulk is not coupled to any fixed voltage level. Rather, a switchable bulk is used. In particular, the bulk is switchable between the negative battery terminal 96 and the load terminal GNDOUT 94. A first switch SW1 82 allows the bulk to be coupled to or de-coupled from the negative battery terminal 96. A second switch SW2 86 allows the bulk to be coupled to or de-coupled from the load terminal GNDOUT 94.

These key structural features of the present invention are used to allow a single NMOS FET switch N1 78 to perform the function of the two switches in the prior art. The operating table for the circuit is given in Table 1 below.

TABLE 1

Operating Conditions for Single NMOS FET Circuit.

| Operating Condition | FET Condition | Bulk Coupling |
| --- | --- | --- |
| Charging | ON | SW2 ON |
| Over Charging | OFF | SW2 ON |
| Charging in Over Discharge State | MOS Diode | SW2 ON |
| Discharging | ON | SW1 ON |
| Over Discharging | OFF | SW1 ON |

TABLE 1-continued

Operating Conditions for Single NMOS FET Circuit.

| Operating Condition | FET Condition | Bulk Coupling |
| --- | --- | --- |
| Discharging in Over Charge State | MOS Diode | SW1 ON |

During a normal charging event, the NMOS FET switch N1 78 is turned ON by the control circuit 74. The bulk is coupled to the load terminal GNDOUT 94 by closing SW2 86 and opening SW1 82. With the bulk biased to GNDOUT, the gate drive of the control circuit can create a minimum ON resistance for NMOS switch N1. The charging source 90 can then source current into the battery to fully recharge it. However, if an over charging condition is detected, wherein the battery voltage rises above a pre-determined set point, then the control circuit 74 turns OFF the NMOS FET switch N1 78 to stop charging current flow. Because the bulk is coupled to GNDOUT 94, a reverse biased p-n diode formed by the bulk and the drain prevents charging current flow from the negative battery terminal 96 to GNDOUT 94.

In the normal discharging case, the NMOS FET switch N1 78 is turned ON by the control circuit 74. In this case, the bulk is coupled to the negative battery terminal GND 96 by closing the switch SW1 82 while opening the switch SW2 86. Discharging current flows through N1 78 from GNDOUT 94 to GND 96. If an over discharge occurs, the battery voltage will drop below a pre-determined value. During an over-discharge, the NMOS FET switch N1 78 is turned OFF by the control circuit 74. However, the bulk remains coupled to the negative terminal GND 96. The bulk-to-source diode is reverse biased and blocks any forward current flow.

Two other error conditions may occur. First, the battery may be charging during an over discharge state. In the over discharge state, the battery has been excessively discharged during a previous operation. During the subsequent charging, the charging current should be limited to protect the battery. Therefore, the gate of N1 78 is coupled to the drain node GND 96 such that the device operates as a MOS diode. In the second condition, the battery may be discharging in an overcharged stated. In this state, the battery has been overcharged. During the subsequent discharging, the current should again be limited to protect the battery. Therefore, the gate of N1 78 is coupled to the source node GNDOUT 94 such that the device again operates as a MOS diode, in this case for forward current.

Figure 6:
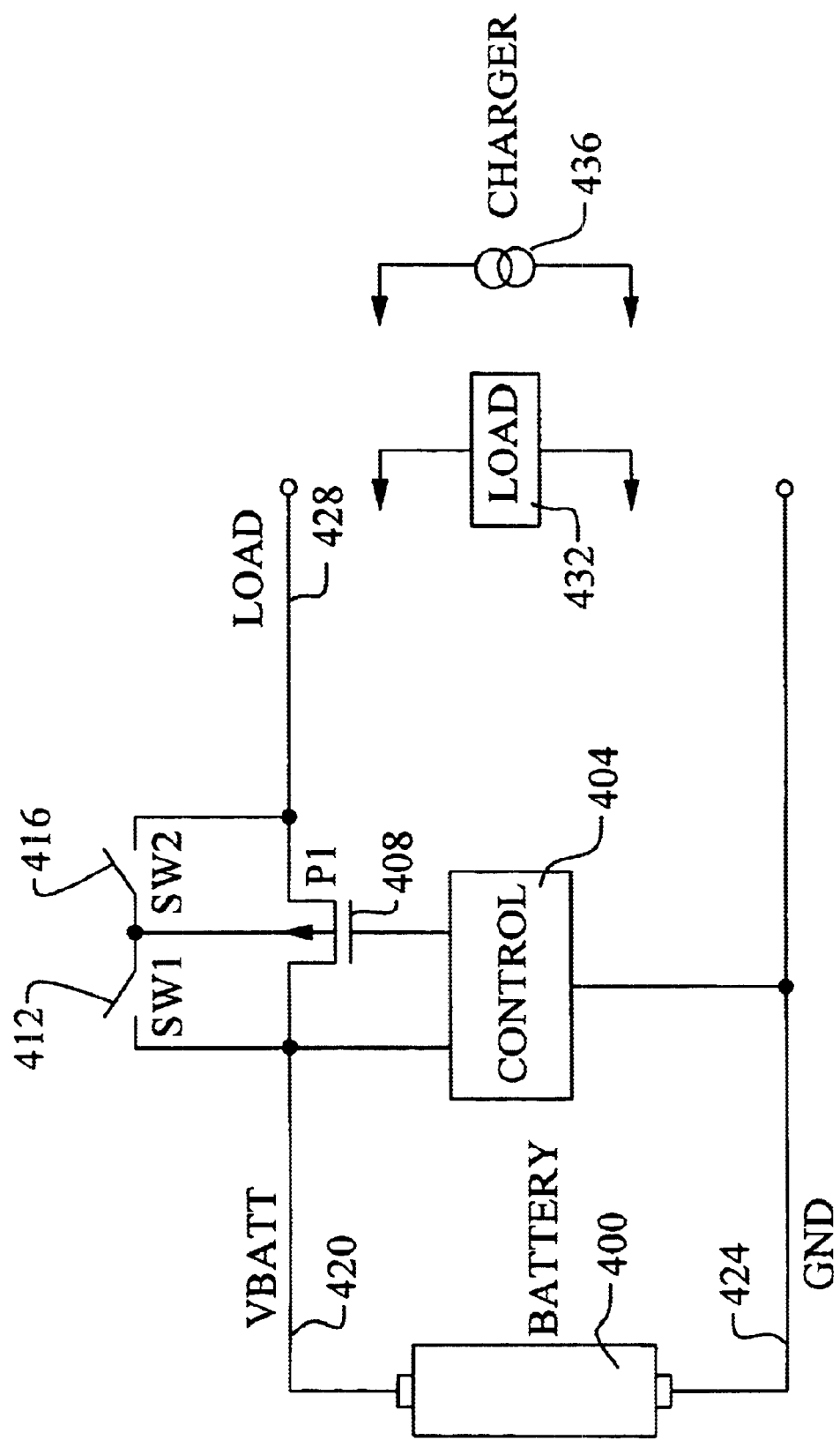
FIG. 6 illustrates the first preferred embodiment using a PMOS FET switch.

Referring now to FIG. 6, an alternative to the first preferred embodiment of the present invention is shown. In this embodiment, a PMOS FET is used for the switch P1 408. In many processes, the NMOS transistor provides much lower ON resistance and is, therefore, the logical choice for a drive switch. However, if a suitable PMOS FET is available, the present invention is easily extendable to use a PMOS FET as the switch. In this case, the PMOS FET switch 408 has source coupled to the load terminal LOAD 428 and drain coupled to the positive battery terminal VBATT 420. The gate is controlled by the control circuit 404. The bulk is again switchable. In this case, however, the bulk is switched between the positive battery terminal 420 and LOAD 428 by switches SW1 412 and SW2 416, respectively. Once again, the bulk of the PMOS device must be a well (n-type) that can be biased independently of the substrate. The operating table for the single PMOS FET version is shown as Table 2 below and operates as the NMOS FET version operates.

TABLE 2

Operating Conditions for Single PMOS FET Circuit.

| Operating Condition | FET Condition | Bulk Coupling |
|---|---|---|
| Charging | ON | SW2 ON |
| Over Charging | OFF | SW2 ON |
| Charging in Over Discharge State | MOS Diode | SW2 ON |
| Discharging | ON | SW1 ON |
| Over Discharging | OFF | SW1 ON |
| Discharging in Over Charge State | MOS Diode | SW1 ON |

During a normal charging, the PMOS FET switch P1 408 is ON while the bulk is biased to the output LOAD 428 by turning ON SW2 416 and turning OFF SW1 412. This enables the switch P1 408 to exhibit minimum ON resistance while not turning on the bulk-to-drain diode and risking latchup. If an over charging is detected, the PMOS FET is turned OFF while the bulk remains at LOAD. The current is thereby blocked by both the switching channel and the reverse biased p-n diode. During a normal discharge, P1 408 is ON while the bulk is biased to the positive battery terminal 420 by turning ON SW1 412 and turning OFF SW2 416. Again, this minimizes the ON resistance. During an over discharge, P1 is turned OFF and the bulk is left at VBATT to insure no forward current. The charging during over discharge condition and the discharging during over charge conditions operate the same as for the NMOS case.

Figure 3:
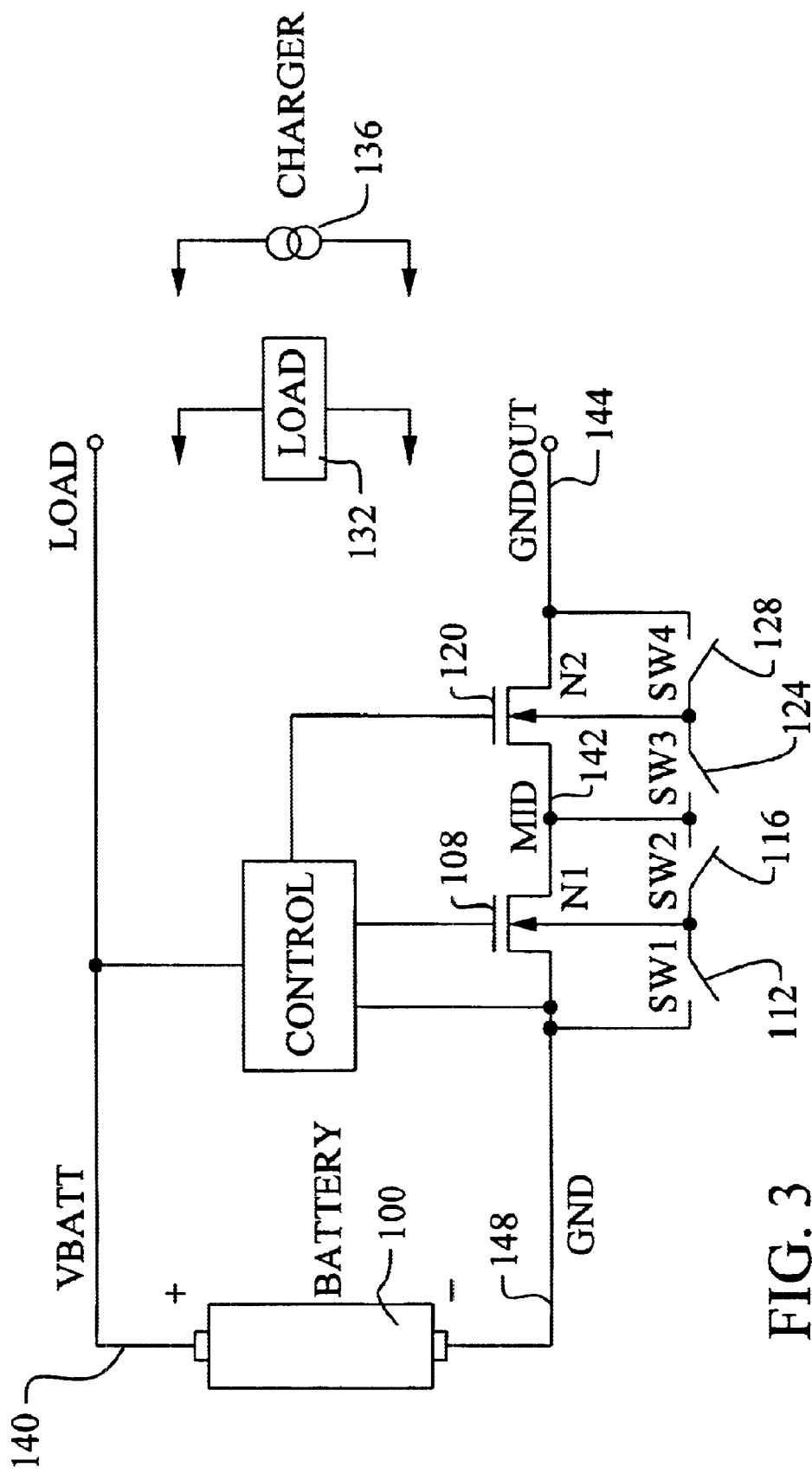
FIG. 3 illustrates a second preferred embodiment of the battery protection circuit of the present invention where two NMOS switches are used for greater operating range.

Referring now to FIG. 3, a second preferred embodiment of the present invention is illustrated. In this embodiment, two NMOS FET switches N1 108 and N2 120 are used. N1 and N2 are cascaded to provide a combined switch having a larger operating voltage range than is available with a single switch. By nature, the battery charging source 136 is capable of generating a larger voltage than the battery 100. When an over charge condition is detected, and the single FET switch is turned OFF, the voltage difference between the charger 90 and the battery 70 must be sustained across the switch. Even with the novel switched bulk structure, the voltage range of the switch is limited by the drain-to-bulk reverse breakdown as given be the manufacturing process. This breakdown voltage may be about 7 Volts, for example. This means that the charger 90 design must be limited to not generate a voltage greater than the battery 70 voltage plus about 7 Volts.

Referring again to FIG. 3, the use of the cascaded NMOS FET devices N1 108 and N2 120 increases the operating range of the combined switch such that a voltage difference of, for example, about 14 Volts can be sustained in the OFF state. The first FET switch N1 has gate, source, drain, and bulk. The drain is coupled to the negative battery terminal, GND 148. The bulk is switchably coupled between the negative battery terminal GND 148 and a middle node MID 142 between the cascaded FET devices N1 108 and N2 120. The second FET switch N2 120 has gate, source, drain, and bulk. The drain is coupled to the first FET switch N1 drain at the mid node MID 142. The source is coupled to the load terminal node GNDOUT 144. The bulk of N2 120 is switchably coupled between MID 142 and the load terminal GNDOUT 144. The control circuit CONTROL 104 drives the gates of N1 108 and N2 120 and the bulk switches SW1 112, SW2 116, SW3 124, and SW4 128. The operating table for the second embodiment using cascaded NMOS FET switches is shown as Table 3 below.

TABLE 3

Operating modes for Cascaded NMOS Circuit.

| Mode | N1 | BULK N1 | N2 | BULK N2 |
|---|---|---|---|---|
| Charging | ON | SW2 ON | ON | SW4 ON |
| Over Charging | OFF | SW2 ON | OFF | SW4 ON |
| Charging in Over Discharged State | ON | SW2 ON | MOS DIODE | SW4 ON |
| Discharging | ON | SW1 ON | ON | SW3 ON |
| Over Discharging | ON | SW1 ON | OFF | SW3 ON |
| Discharging in Over Charged State | ON | SW1 ON | MOS DIODE | SW3 ON |

The operating concept of the single NMOS FET is extended to create the cascaded switch. When the circuit is in the charging or discharging mode, both of the transistors N1 and N2 are ON. The bulk of N1 108 is coupled to the MID node 142 by turning ON SW2 116. The bulk of N2 120 is coupled to the load terminal GNDOUT 144 by turning ON SW4 128. If an over charging condition is detected, the control circuit 104 turns OFF both switches N1 and N2 to interrupt current flow. The configuration of the bulks presents a series of reversed biased p-n junctions between the negative battery terminal GND 148 and the load terminal GNDOUT to thereby block charging current. The use of two NMOS devices allows the voltage difference between GND 148 and GNDOUT 144 to drop across two bulk-to-drain diodes and thereby increases the operating range when compared to a single transistor approach.

If an over discharge event is detected, the control circuit 104 turns OFF N2 120. In this case, however the bulk of N1 108 is coupled to GND 148 by SW1 112 and the bulk of N2 120 is coupled to MID 142 by SW3 124. This creates a series of reverse biased p-n diodes from the GNDOUT 144 to GND 148. Discharging current flow is thereby stopped by the channel of N2 and the reverse-biased diodes.

In the charging an over discharged battery case and in the discharging the over charged battery case, the cascaded circuit works in a similar mode as the single FET circuit. Note that the first transistor N1 108 is held ON for both cases. However, the second transistor N2 120 is biased to the MOS diode case to protect the battery as in the single FET circuit.

Figure 7:
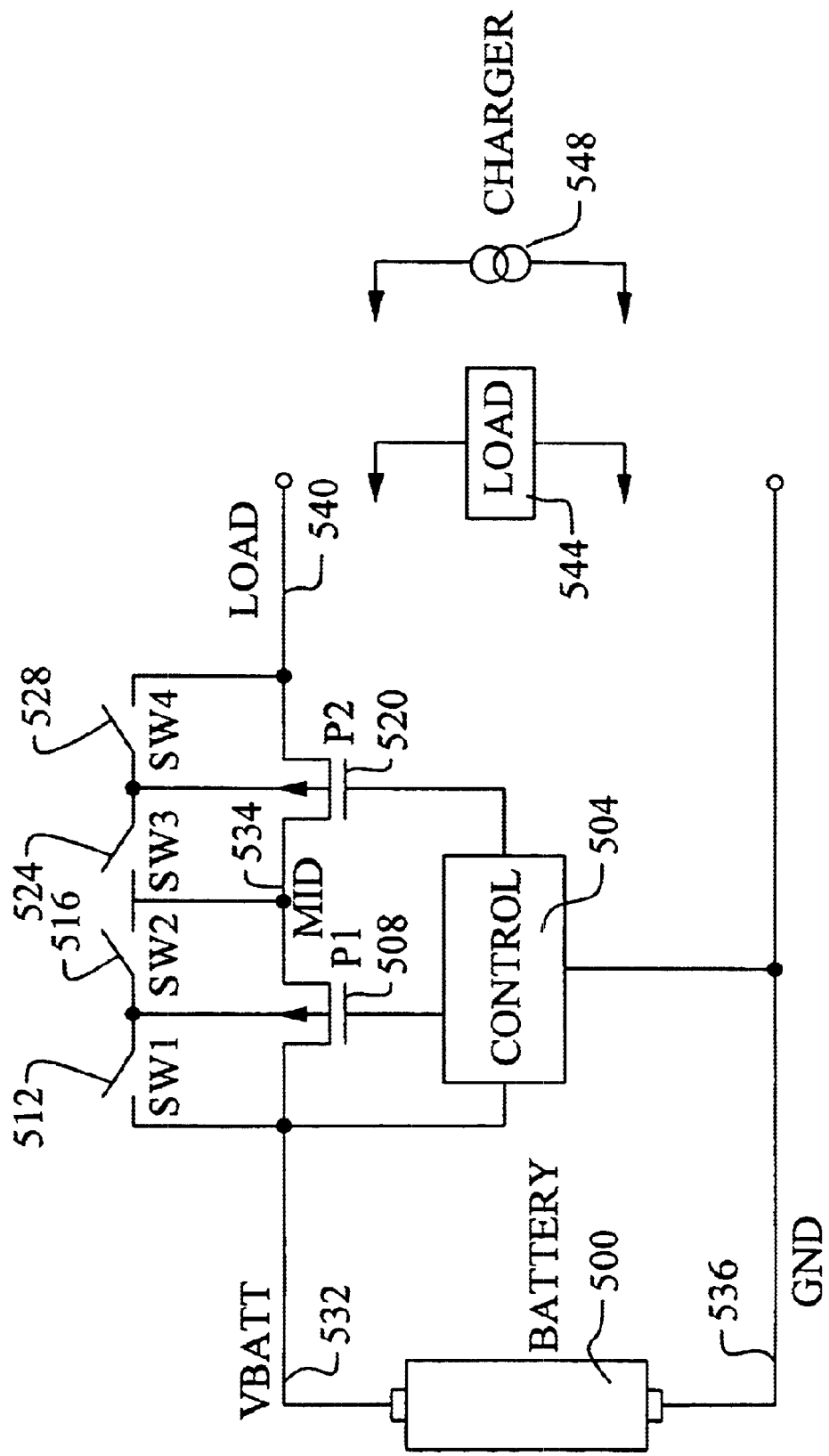
FIG. 7 illustrates the second preferred embodiment using two PMOS FET switches.

Referring now to FIG. 7, a PMOS version of the second embodiment cascade circuit is shown. In the PMOS version, two PMOS FET switches P1 508 and P2 520 are connected is series. The bulk for the first PMOS FET P1 508 is switched between the positive battery terminal VBATT 532 and the MID node 534. The bulk of the second PMOS FET P2 520 is switched between the MID node 534 and the load terminal LOAD 540. The operating table for the PMOS version of the cascaded circuit is shown below in Table 4 and is the same as that for the cascaded NMOS version.

TABLE 4

Operating modes for Cascaded PMOS Circuit.

| Mode | N1 | BULK N1 | N2 | BULK N2 |
|---|---|---|---|---|
| Charging | ON | SW2 ON | ON | SW4 ON |
| Over Charging | OFF | SW2 ON | OFF | SW4 ON |
| Charging in Over Discharged State | ON | SW2 ON | MOS DIODE | SW4 ON |
| Discharging | ON | SW1 ON | ON | SW3 ON |
| Over Discharging | ON | SW1 ON | OFF | SW3 ON |

TABLE 4-continued

Operating modes for Cascaded PMOS Circuit.

| Mode | N1 | BULK N1 | N2 | BULK N2 |
|---|---|---|---|---|
| Discharging in Over Charged State | ON | SW1 ON | MOS DIODE | SW3 ON |

During normal charging mode, both P1 508 and P2 520 are ON. The bulk of P1 is coupled to MID 534 while the bulk of P2 520 is coupled to LOAD 540 to minimize the ON resistance of the switches. If an over charge is detected, both P1 and P2 are turned OFF by the control circuit 504. The bulk of P1 remains at MID while the bulk of P2 remains at LOAD. This creates a series of reverse biased p-n diodes between VBATT 532 and the high voltage LOAD 540 to block current flow into the battery 500. During discharging, P1 and P2 are ON. The bulk of P1 is biased to VBATT while the bulk of P2 is biased to MID to reduce ON resistance. If an over discharge is detected, P2 is turned OFF. The bulk of P1 is kept at VBATT 532 while the bulk of P2 is kept at MID 534. This presents a series of reverse biased p-n diodes between VBATT and LOAD.

The cascaded switching configuration of the second embodiment, as illustrated in FIGS. 3 and 7, may be extended to three or more switches if needed to create adequate operating voltage. A problem that the may occur with the cascaded switch configuration is the floating of the MID node when both of the FET switches are OFF. Referring again to FIG. 3, if an over charging event causes both N1 108 and N2 120 to be switched OFF, then the bulk of N1 is coupled to MID 142 and the bulk of N2 is coupled to GNDOUT 144. Because the bulk-drain p-n diodes are reverse biased, the bulk of N1, which is coupled to MID, is actually floating. A non-uniform voltage distribution between the two bulk-drain diodes may exist and could cause one of the diodes to conduct.

Figure 4:
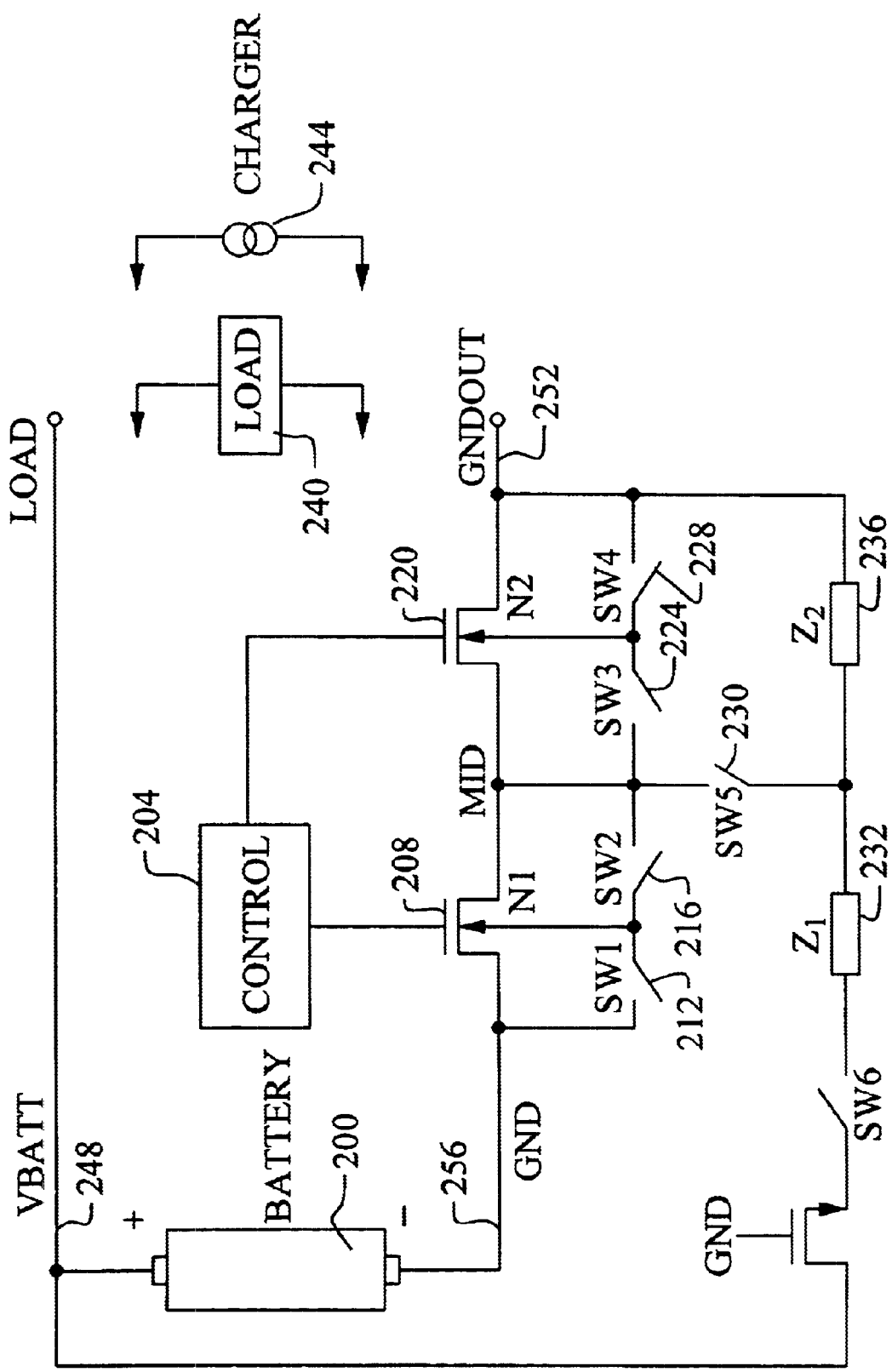
FIG. 4 illustrates a third preferred embodiment of the present invention where a voltage divider is added to bias the mid node.

Referring now to FIG. 4, this problem is eliminated by adding a voltage divider $Z_1$ 232 and $Z_2$ 236 between the positive battery terminal VBATT 248 and the load terminal GNDOUT 252. The purpose of the voltage divider is to provide a means of insuring that the voltage difference is evenly split between each bulk-drain diode so that the full operating range is achieved without turning on the parasitic vertical npn. The voltage divider $Z_1$ 232 and $Z_2$ 236 may comprise, for example, two resistors of equal value. The addition of the voltage divider to steer the bulk potentials may also be added to the PMOS version of the cascaded switch circuit shown in FIG. 7. In addition to the voltage divider $Z_1$ 232 and $Z_2$ 236, switches SW5 and SW6 are added to allow the biasing voltage to be switched ON and OFF as needed. The operating table for third embodiment including the voltage divider is shown as Table 5 below. The voltage divider is only coupled to the MID node when the circuit is in the charging mode. Note that the same operating table applies to both NMOS and PMOS versions.

TABLE 5

Operating modes for Cascaded Circuit including Voltage Divider.

| Mode | SW5 | SW6 | N1 | BULK N1 | N2 | BULK N2 |
|---|---|---|---|---|---|---|
| Charging | ON | OFF | ON | SW2 ON | ON | SW4 ON |
| Over Charging | ON | ON | OFF | SW2 ON | OFF | SW4 ON |

TABLE 5-continued

Operating modes for Cascaded Circuit including Voltage Divider.

| Mode | SW5 | SW6 | N1 | BULK N1 | N2 | BULK N2 |
|---|---|---|---|---|---|---|
| Charging in Over Discharged State | ON | OFF | ON | SW2 ON | MOS DIODE | SW4 ON |
| Discharging | OFF | OFF | ON | SW1 ON | ON | SW3 ON |
| Over Discharging | OFF | OFF | ON | SW1 ON | OFF | SW3 ON |
| Discharging in Over Charged State | OFF | OFF | ON | SW1 ON | MOS DIODE | SW3 ON |

Figure 5:
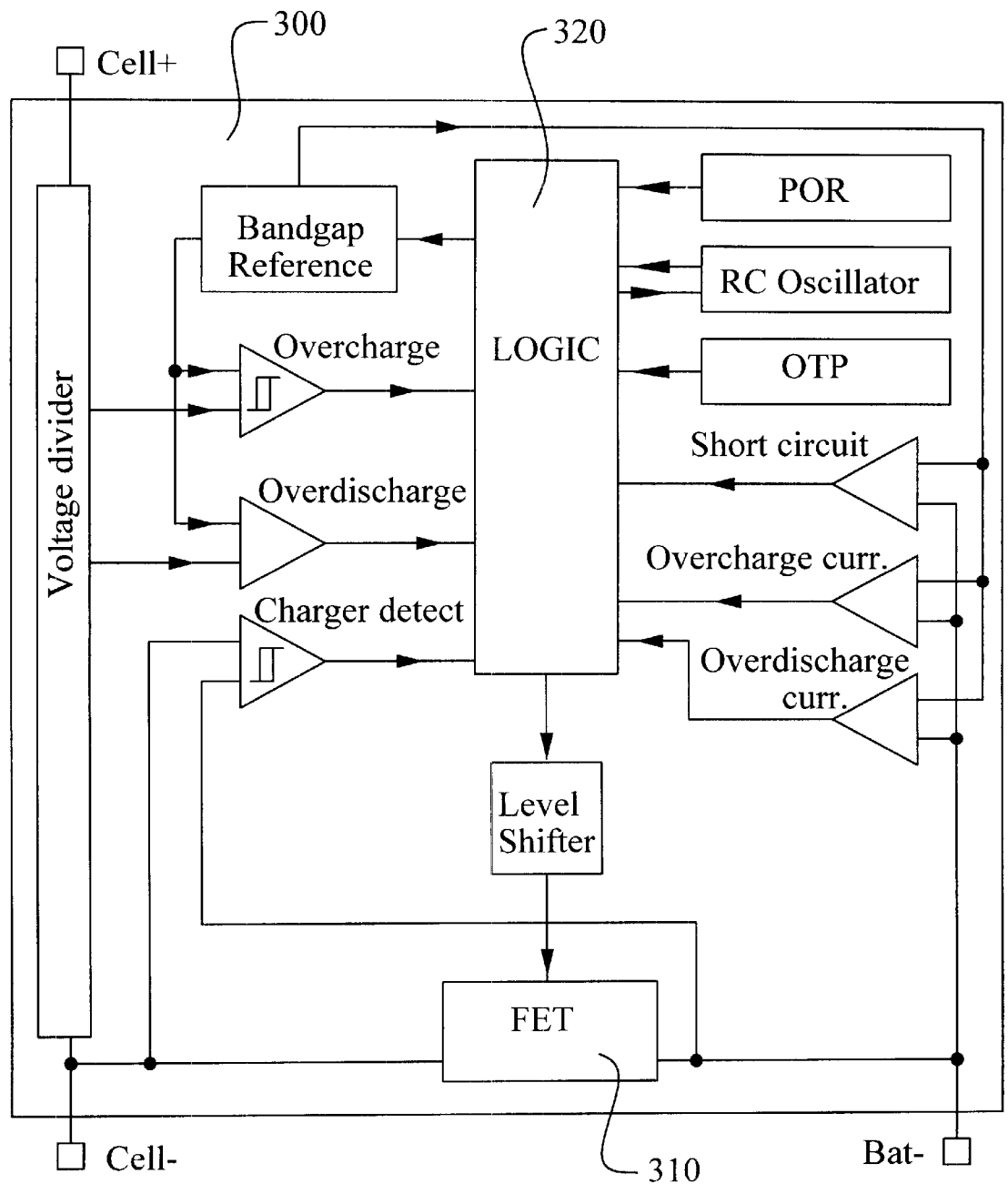
FIG. 5 illustrates an exemplary application of the present invention.

Referring now to FIG. 5, a block level diagram of an application of the present invention is shown. A battery control and protection circuit 300 for a rechargeable battery is shown. The circuit 300 may comprise a single monolithic IC or a combination of IC chips and discrete components. Circuits are included to detect over voltage and current conditions. The logic block 320 uses these inputs to control the FET block 310 which comprises either a single FET or cascaded FET devices as disclosed in the present invention.

The present invention provides an effective and very manufacturable circuit for protecting a battery. The battery protection circuit controls charging and discharging of a battery. Both charging and discharging is controlled via a single FET having a switchable bulk connection. Switchable bulk FET devices may be cascaded to increase the voltage range of the circuit. The switchable bulk FET devices may comprise either NMOS or PMOS devices. The middle node between cascaded FET devices is steered to a known voltage during over charging to further improve performance.

As shown in the preferred embodiments, the novel circuit provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A battery charging, discharging, and protection circuit comprising:

a FET switch having gate, source, drain, and bulk, wherein said source is coupled to a load terminal and said drain is coupled to a battery terminal and a means of controlling said FET switch gate and said bulk wherein said FET switch gate voltage determines the OFF and ON state of said FET switch and wherein said bulk is switchably coupled between said battery terminal and said load terminal.

2. The circuit according to claim 1 wherein said FET switch comprises a NMOS FET and said battery terminal comprises a negative battery terminal.

3. The circuit according to claim 1 wherein said FET switch comprises a PNMOS FET and said battery terminal comprises a positive battery terminal.

4. The circuit according to claim 1 wherein said means of controlling and said FET switch comprise a single integrated circuit device.

5. The circuit according to claim 1 wherein said bulk is coupled to said load terminal during battery charging.

6. The circuit according to claim 5 wherein said FET switch is turned to said ON state during normal charging and is turned to said OFF state during over charging.

7. The circuit according to claim 5 wherein said FET switch acts as a MOS diode during charging in a battery over discharge state.

8. The circuit according to claim 1 wherein said bulk is coupled to said battery terminal during battery discharging.

9. The circuit according to claim 8 wherein said FET switch is turned to said ON state during normal discharging and is turned to said OFF state during over discharging.

10. The circuit according to claim 1 wherein said FET switch acts as a MOS diode during discharging in a battery over charge state.

11. A battery charging, discharging, and protection circuit comprising:
- a first FET switch having gate, source, drain, and bulk, wherein said drain is coupled to a battery terminal;
- a second FET switch having gate, source, drain, and bulk, wherein said drain is coupled to said first NMOS FET switch source to thereby form a mid node and wherein said source is coupled to a load terminal; and
- a means of controlling said first and second FET gates and switchable bulks wherein said first and second FET switch gates voltages determine the OFF and ON states of said first and second FET switches, wherein said first FET bulk is switchably coupled between said battery terminal and said mid node, and wherein said second FET bulk is switchably coupled between said mid node and said load terminal.

12. The circuit according to claim 11 wherein said first and second FET switches comprise NMOS FET devices and wherein said battery terminal comprises a negative battery terminal.

13. The circuit according to claim 11 wherein said first and second FET switches comprise PMOS FET devices and wherein said battery terminal comprises a positive battery terminal.

14. The circuit according to claim 11 wherein said means of controlling and said FET switches comprise a single integrated circuit device.

15. The circuit according to claim 11 wherein said first FET switch bulk is coupled to said mid node and said second FET switch is coupled to said load terminal during battery charging.

16. The circuit according to claim 15 wherein said first FET switch and said second FET switch are turned to said ON state during normal charging and are turned to said OFF state during over charging.

17. The circuit according to claim 15 wherein said first FET switch is turned to said ON state and said second FET switch acts as a MOS diode during charging in a battery over discharge state.

18. The circuit according to claim 11 wherein said first FET switch bulk is coupled to said battery terminal and said second FET switch bulk is coupled to said mid node during battery discharging.

19. The circuit according to claim 18 wherein said first and second FET switches are turned to said ON state during normal discharging and wherein said second FET switch is turned to said OFF state during over discharging.

20. The circuit according to claim 18 wherein said first FET switch is turned to said ON state and said second FET switch acts as a MOS diode during discharging in a battery over charge state.

21. The circuit according to claim 11 further comprising:
- a voltage divider having an output comprising a voltage value between a second battery terminal voltage and said load terminal voltage; and
- a means of coupling said voltage divider output and said mid node.

22. The circuit according to claim 21 wherein said switch is turned ON during battery charging and said switch is turned OFF during battery discharging.

23. A battery charging, discharging, and protection circuit comprising:
- a first FET switch having gate, source, drain, and bulk, wherein said drain is coupled to a first battery terminal;
- a second FET switch having gate, source, drain, and bulk, wherein said drain is coupled to said first NMOS FET switch source to thereby form a mid node and wherein said source is coupled to a load terminal;
- a voltage divider having an output comprising a voltage value between a second battery terminal voltage and said load terminal voltage;
- a means of coupling said voltage divider output and said mid node; and
- a means of controlling said first and second FET gates, said switchable bulks, and said switch wherein said first and second FET switch gates voltages determine the OFF and ON states of said first and second FET switches, wherein said first FET bulk is switchably coupled between said first battery terminal and said mid node, and wherein said second FET bulk is switchably coupled between said mid node and said load terminal.

24. The circuit according to claim 23 wherein said first and second FET switches comprise NMOS FET devices and wherein said first battery terminal comprises a negative battery terminal and said second battery terminal comprises a positive battery terminal.

25. The circuit according to claim 23 wherein said first and second FET switches comprise PMOS FET devices and wherein said first battery terminal comprises a positive battery terminal and said second battery terminal comprises a negative battery terminal.

26. The circuit according to claim 23 wherein said means of controlling and said FET switches comprise a single integrated circuit device.

27. The circuit according to claim 23 wherein said first FET switch bulk is coupled to said mid node, wherein said second FET switch bulk is coupled to said load terminal during battery charging, and wherein said voltage divider output is coupled to said mid node during battery charging.

28. The circuit according to claim 27 wherein said first FET switch and said second FET switch are turned to said ON state during normal charging and are turned to said OFF state during over charging.

29. The circuit according to claim 27 wherein said first FET switch is turned to said ON state and said second FET switch acts as a MOS diode during charging in a battery over discharge state.

30. The circuit according to claim 23 wherein said first FET switch bulk is coupled to said battery terminal, wherein said second FET switch bulk is coupled to said mid node, and wherein said voltage divider output is not coupled to said mid node during battery discharging.

31. The circuit according to claim 30 wherein said first and second FET switches are turned to said ON state during normal discharging and wherein said second FET switch is turned to said OFF state during over discharging.

32. The circuit according to claim 30 wherein said first FET switch is turned to said ON state and said second FET switch acts as a MOS diode during discharging in a battery over charge state.

* * * * *